(12) United States Patent
Dyckerhoff et al.

(10) Patent No.: US 8,131,854 B2
(45) Date of Patent: *Mar. 6, 2012

(54) INTERFACING WITH STREAMS OF DIFFERING SPEEDS

(75) Inventors: Stefan Dyckerhoff, San Jose, CA (US); Kong Kritayakirana, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,794

(22) Filed: Feb. 2, 2010

(65) Prior Publication Data

US 2010/0138554 A1 Jun. 3, 2010

Related U.S. Application Data

(63) Continuation of application No. 09/991,109, filed on Nov. 26, 2001, now Pat. No. 7,698,454.

(51) Int. Cl.
*G06F 15/173* (2006.01)
(52) U.S. Cl. .......................... 709/225; 709/226; 709/228
(58) Field of Classification Search .................. 709/225, 709/226, 228
See application file for complete search history.

(56) References Cited

U.S. PATENT DOCUMENTS

| | | | |
|---|---|---|---|
| 5,602,852 A | 2/1997 | Shiobara | |
| 5,721,955 A | 2/1998 | Cedros et al. | |
| 5,754,961 A | 5/1998 | Serizawa et al. | |
| 5,761,417 A | 6/1998 | Henley et al. | |
| 5,815,170 A | 9/1998 | Kimura et al. | |
| 5,828,902 A | 10/1998 | Tanaka et al. | |
| 5,875,192 A | 2/1999 | Cam et al. | |
| 5,875,309 A | 2/1999 | Itkowsky et al. | |
| 5,923,755 A | 7/1999 | Birch | |
| 5,926,459 A | 7/1999 | Lyles et al. | |
| 5,930,014 A | 7/1999 | Yamamoto | |
| 5,970,067 A | 10/1999 | Sathe et al. | |
| 6,061,348 A | 5/2000 | Castrigno et al. | |
| 6,078,958 A | 6/2000 | Echeita et al. | |
| 6,085,238 A | 7/2000 | Yuasa et al. | |
| 6,167,445 A | 12/2000 | Gai et al. | |
| 6,173,369 B1 | 1/2001 | Nguyen et al. | |
| 6,199,131 B1 | 3/2001 | Melo et al. | |
| 6,240,508 B1 | 5/2001 | Brown et al. | |
| 6,269,096 B1 | 7/2001 | Hann et al. | |
| 6,321,233 B1 | 11/2001 | Larson | |
| 6,490,296 B2 | 12/2002 | Shenoi et al. | |
| 6,577,596 B1 | 6/2003 | Olsson et al. | |
| 6,598,034 B1 | 7/2003 | Kloth | |

(Continued)

OTHER PUBLICATIONS

Final Office Action from U.S. Appl. No. 09/942,625, dated Jan. 31, 2008; 14 pages.

(Continued)

*Primary Examiner* — Adnan Mirza
(74) *Attorney, Agent, or Firm* — Harrity & Harrity, LLP

(57) ABSTRACT

A system processes packet data received in a number of incoming streams of variable speeds. The system includes an input interface, input logic, and one or more packet processors. The input interface receives the packet data and outputs the data using a first arbitration element. The input logic includes flow control logic, a memory, and a dispatch unit. The flow control logic initiates flow control on the data output by the input interface. The memory stores the data from the input interface. The dispatch unit reads the data from the memory using a second arbitration element. The packet processor(s) process the data from the dispatch unit.

23 Claims, 11 Drawing Sheets

U.S. PATENT DOCUMENTS

| | | |
|---|---|---|
| 6,658,014 B1 | 12/2003 | Tezuka |
| 6,674,805 B1 | 1/2004 | Kovacevic et al. |
| 6,678,275 B1 | 1/2004 | DeGrandpre et al. |
| 6,693,909 B1 | 2/2004 | Mo et al. |
| 6,721,789 B1 | 4/2004 | DeMoney |
| 6,742,118 B1 | 5/2004 | Doi et al. |
| 6,754,741 B2 | 6/2004 | Alexander |
| 6,771,600 B2 | 8/2004 | Kawarai et al. |
| 6,782,007 B1 | 8/2004 | Redman |
| 6,788,702 B1 | 9/2004 | Garcia-Luna-Aceves et al. |
| 6,795,506 B1 | 9/2004 | Zhang et al. |
| 6,816,907 B1 | 11/2004 | Mei et al. |
| 6,822,960 B1 | 11/2004 | Manchester et al. |
| 6,941,252 B2 | 9/2005 | Nelson et al. |
| 6,947,450 B2 | 9/2005 | Mangin |
| 6,970,921 B1 | 11/2005 | Wang et al. |
| 6,978,311 B1 | 12/2005 | Netzer et al. |
| 7,016,366 B2 | 3/2006 | Kawarai et al. |
| 7,050,468 B2 | 5/2006 | Seto et al. |
| 7,082,102 B1 | 7/2006 | Wright |
| 7,151,749 B2 * | 12/2006 | Vega-Garcia et al. ..... 370/241.1 |
| 7,151,774 B1 | 12/2006 | Williams et al. |
| 7,184,434 B2 | 2/2007 | Ganti et al. |
| 7,698,454 B1 | 4/2010 | Dyckerhoff et al. |
| 2001/0023445 A1 * | 9/2001 | Sundqvist .................... 709/228 |
| 2002/0046251 A1 | 4/2002 | Siegel |
| 2002/0071389 A1 | 6/2002 | Seo |

OTHER PUBLICATIONS

Co-pending U.S. Appl. No. 09/991,109, filed Nov. 26, 2001 entitled "Systems and Methods for Interfacing with Variable Speed", Stefan Dyckerhoff et al., 43 pages.

Office Action from U.S. Appl. No. 09/942,625, dated Feb. 24, 2005; 13 pages.

Office Action from U.S. Appl. No. 09/942,625, dated Aug. 10, 2005; 13 pages.

Office Action from U.S. Appl. No. 09/942,625, dated Mar. 3, 2006; 12 pages.

Office Action from U.S. Appl. No. 09/942,625, dated Aug. 23, 2006; 13 pages.

Office Action from U.S. Appl. No. 09/942,625, dated Feb. 23, 2007; 14 pages.

Song Zhang et al.; U.S. Appl. No. 09/942,625, filed Aug. 31, 2001; 41 pages.

* cited by examiner

INTERFACING WITH STREAMS OF DIFFERING SPEEDS

This application is a continuation of U.S. patent application Ser. No. 09/991,109, filed Nov. 26, 2001, the disclosure of which is incorporated herein by reference.

BACKGROUND OF THE INVENTION

1. Field of the Invention

The present invention relates generally to data transfer and, more particularly, to systems and methods for interfacing to multiple streams of variable speeds.

2. Description of Related Art

Routers receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was turned on.

To meet the new demands, purpose-built routers were designed. Purpose-built routers are designed and built with components optimized for routing. They not only handled higher line rates and higher network traffic volume, but they also added functionality without compromising line rate performance.

A conventional purpose-built router may include a number of input and output ports from which it receives and transmits streams of information packets. A switching fabric may be implemented in the router to carry the packets between the ports. In a high-performance purpose-built router, the switching fabric may transmit a large amount of information between a number of internal components.

The conventional routers are typically configured based on the speeds of the packet streams they receive. If the speed of one of the streams changes, the routers typically must be reconfigured. Reconfiguring a router is generally a complicated and time-consuming process. Also, reconfiguring in response to a change in speed of a single stream may adversely affect other streams processed by the router.

As a result, there is a need in the art for a router that can handle streams of varying speeds without requiring major reconfiguration.

SUMMARY OF THE INVENTION

Systems and methods consistent with the principles of the invention address this and other needs by providing input logic that interfaces to multiple streams of packet data with varying speeds without requiring major reconfiguration.

One aspect consistent with the principles of the invention is a system that processes packet data received in a number of incoming streams of variable speeds. The system includes an input interface, input logic, and one or more packet processors. The input interface receives the packet data and outputs the data using a first arbitration element. The input logic includes flow control logic, a memory, and a dispatch unit. The flow control logic initiates flow control on the data output by the input interface. The memory stores the data from the input interface. The dispatch unit reads the data from the memory using a second arbitration element. The packet processor(s) process the data from the dispatch unit.

In another aspect consistent with the principles of the invention, a method for processing data received in a plurality of incoming streams of variable speeds includes storing data in a memory using a first arbitration element, and reading the data from the memory using a second arbitration element.

In yet another aspect consistent with the principles of the invention, a method for performing flow control on data in a plurality of incoming streams of variable speeds includes storing data in a plurality of entries in a buffer; determining the number of entries in the buffer corresponding to each of the streams; and determining whether to initiate flow control for each of the streams based on the determined number of entries for the stream.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide input logic for a multistream interface of a routing system. The input logic permits multiple input streams to interface to the routing system without requiring reconfiguration of the routing system in response to changes to the stream speed.

System Configuration

Figure 1:
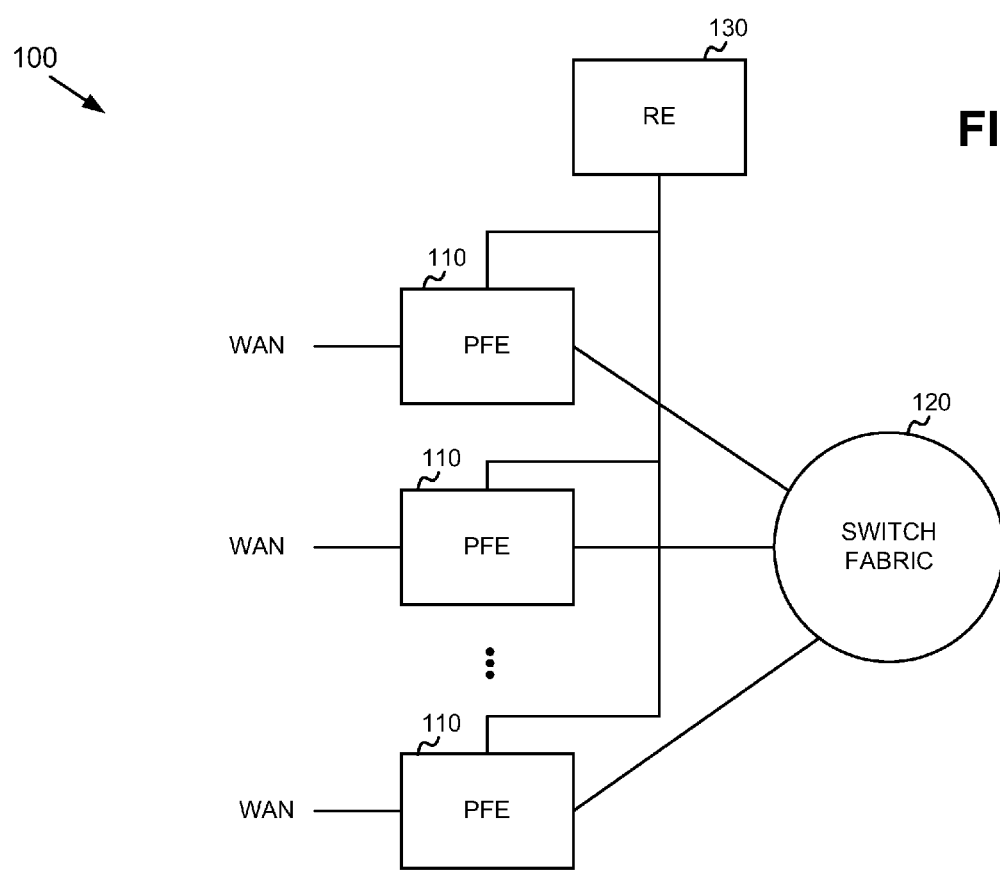
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 receives a data stream from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 110 processes incoming data by stripping off the data link layer. PFE 110 converts header information from the remaining data into a data structure referred to as a notification. For example, in one embodiment, the data remaining after the data link layer is stripped off is packet data. PFE 110 converts the layer 2 (L2) and layer 3 (L3) packet header information included with the packet data into a notification. PFE 110 may store the information in the notification, some control information regarding the packet, and the packet data in a series of cells. In one embodiment, the notification and the control information are stored in the first two cells of the series of cells.

PFE 110 performs a route lookup using the notification and the forwarding table from RE 130 to determine destination information. PFE 110 may also further process the notification to perform protocol-specific functions, policing, and accounting, and might even modify the notification to form a new notification.

If the destination indicates that the packet should be sent out on a physical link connected to PFE 110, then PFE 110 retrieves the cells for the packet, converts the modified notification information into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the first two cells with the modified notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, RE 130, PFEs 110, and switch fabric 120 perform routing based on packet-level processing. PFEs 110 store each packet using cells while performing a route lookup using a notification, which is based on packet header information. A packet might be received on one PFE and go back out to the network on the same PFE, or be sent through switch fabric 120 to be sent out to the network on a different PFE.

Figure 2:
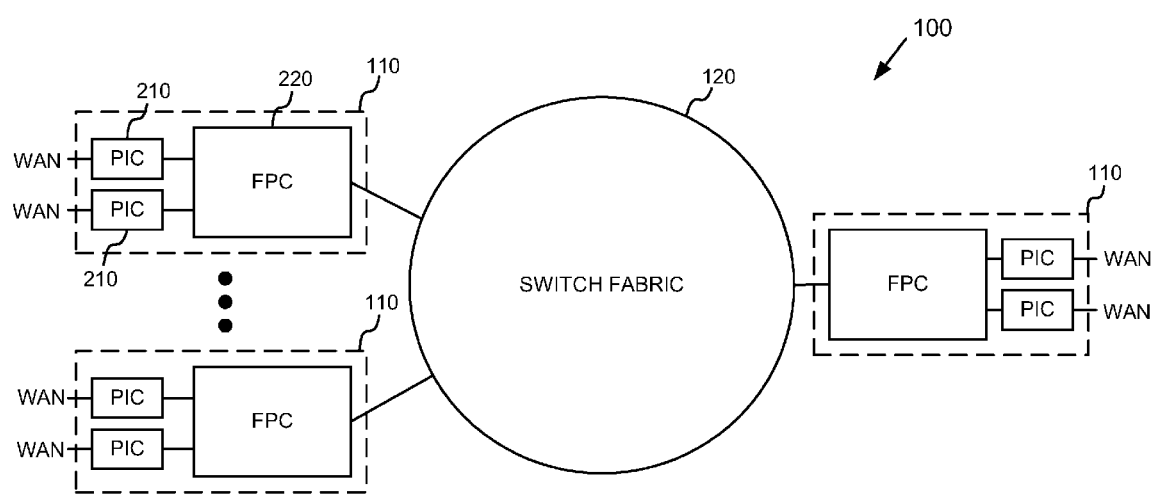
FIG. 2 is a detailed block diagram illustrating portions of the routing system of FIG. 1.

FIG. 2 is a detailed block diagram illustrating portions of routing system 100. PFEs 110 connect to one another through switch fabric 120. Each of the PFEs may include one or more physical interface cards (PICs) 210 and flexible port concentrators (FPCs) 220.

PIC 210 may transmit data between a WAN physical link and FPC 220. Different PICs may be designed to handle different types of WAN physical links. For example, one of PICs 210 may be an interface for an optical link while the other PIC may be an interface for an Ethernet link.

Figure 3A:
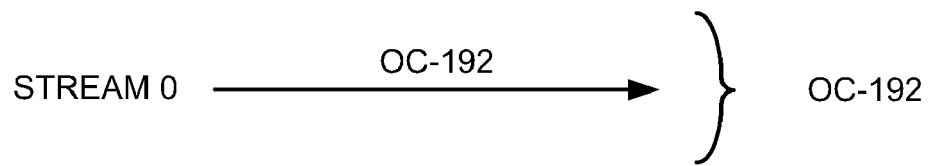
FIGS. 3A-3C are exemplary diagrams of WAN physical links consistent with principles of the invention.
Figure 3B:
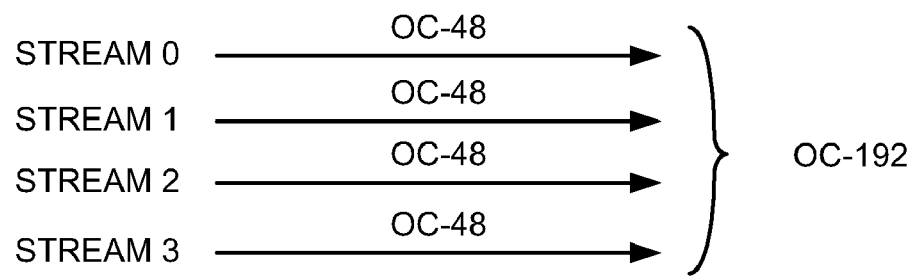
Figure 3C:
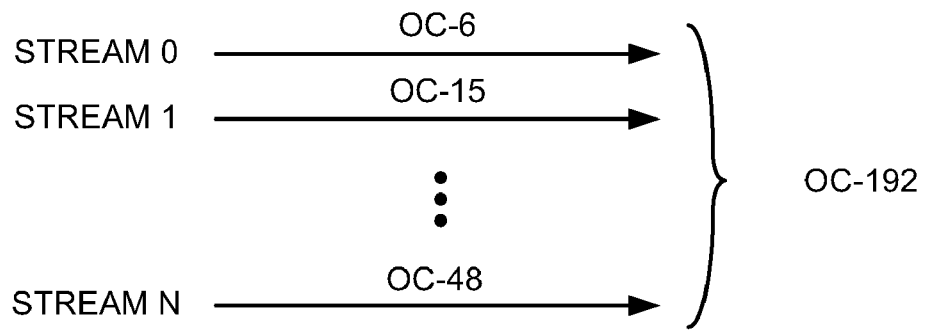

FIGS. 3A-3C are exemplary diagrams of WAN physical links consistent with principles of the invention. The examples of FIGS. 3A-3C assume that the WAN link contains a total bandwidth of STS-192. In FIG. 3A, a single stream contains the entire STS-192 bandwidth. In FIG. 3B, the STS-192 bandwidth is divided among four STS-48 streams. In FIG. 3C, the STS-192 bandwidth is divided into N streams of varying bandwidth.

Returning to FIG. 2, FPCs 220 perform routing functions and handle packet transfers to and from PICs 210 and switch fabric 120. For each packet it handles, FPC 220 performs the previously-discussed route lookup function. Although FIG. 2 shows two PICs 210 connected to each of FPCs 220 and three FPCs 220 connected to switch fabric 120, in other embodiments consistent with principles of the invention there can be more or fewer PICs 210 and FPCs 220.

Exemplary PIC Configuration

Figure 4:
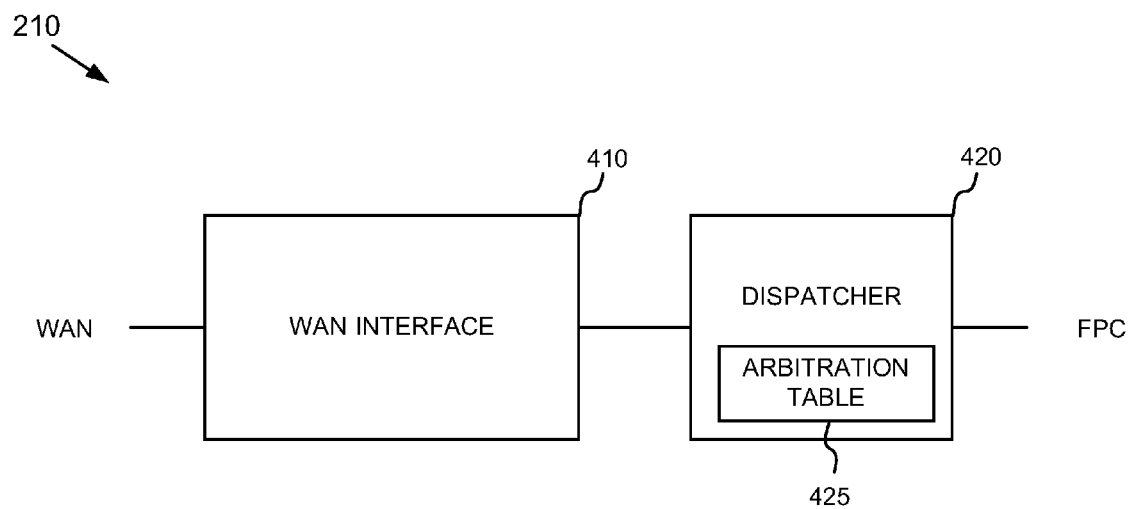
FIG. 4 is an exemplary diagram of a physical interface card (PIC) of FIG. 2.

FIG. 4 is an exemplary diagram of a PIC 210 consistent with the principles of the invention. PIC 210 will be described in terms of the logic it may have for processing streams of packet data it receives from the WAN. It should be understood that PIC 210 may include similar or different logic for processing packet data for transmission to the WAN.

In the implementation illustrated in FIG. 4, PIC 210 includes WAN interface 410 and FPC interface controller 420. WAN interface 410 may include logic that connects to one or more particular types of physical WAN links to receive streams of packets from the WAN. For example, in one particular implementation consistent with principles of the invention, WAN interface 410 may handle 64 separate streams of packets.

WAN interface 410 may also include logic that processes packets received from the WAN. For example, WAN interface 410 may include logic that strips off the layer 1 (L1) protocol information from incoming data and forwards the remaining data, in the form of raw packets, to interface controller 420.

Interface controller 420 may include logic that determines how to allocate bandwidth to streams of packet data sent to FPC 220. Interface controller 420 can handle varying levels of granularity of stream speeds. For example, in one implementation, stream speeds are programmed to STS-3 granularity. To implement varying granularity, interface controller 420 may use an arbitration element, such as arbitration table 425, that has entries corresponding to a particular unit of bandwidth. Arbitration elements other than tables may also be used. Arbitration table 425 might, for example, consist of 64 entries, with each entry corresponding to an STS-3's worth of bandwidth. Each entry in the table can be a 6-bit number indicating which stream is to be serviced for that arbitration slot.

For purposes of illustration, assume that arbitration table 425 allocates bandwidth among four streams, labeled as 0-3. In this case, arbitration table 425 may be configured as follows:

| STREAM NUMBER |
| --- |
| 0 |
| 1 |
| 2 |
| 1 |
| 3 |
| 1 |
| 0 |
| 1 |
| 2 |

In this example, stream 1 is allocated much more of the bandwidth than are streams 0, 2, and 3. Interface controller 420 may read a stream number from arbitration table 425, gather data from the corresponding stream, attach a stream identifier (ID), and transmit the data to FPC 220.

Arbitration table 425 may be programmed under software control. For example, an operator may specify a speed for each of the packet streams. The software may then update arbitration table 425 based on the specified speeds. A faster stream may be given more slots and a slower stream may be given less slots in arbitration table 425.

Exemplary FPC Configuration

Figure 5:
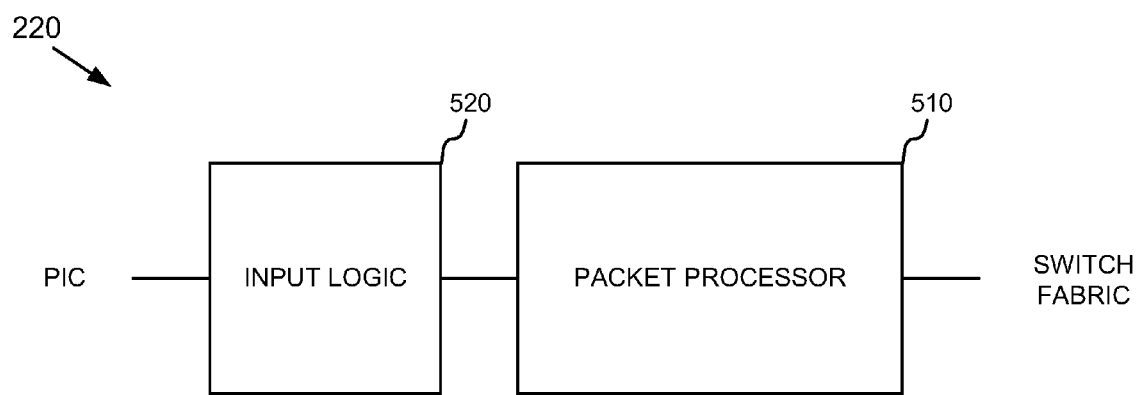
FIG. 5 is an exemplary diagram of a flexible port concentrator (FPC) of FIG. 2.

FIG. 5 is an exemplary diagram of FPC 220 consistent with principles of the invention. FPC 220 will be described in terms of the logic it may have for processing streams of packet data it receives from PIC 210. It should be understood that FPC 220 may include similar or different logic for processing packet data for transmission to PIC 210.

In the implementation illustrated in FIG. 5, FPC 220 includes packet processor 510 and input logic 520. Packet processor 510 may process packet data received from PICs 210 and create packet data for transmission out to the WAN via PICs 210. Packet processor 510 may also process packet data received from switch fabric 120 and transmit packet data to other PFEs via switch fabric 120.

Figure 6:
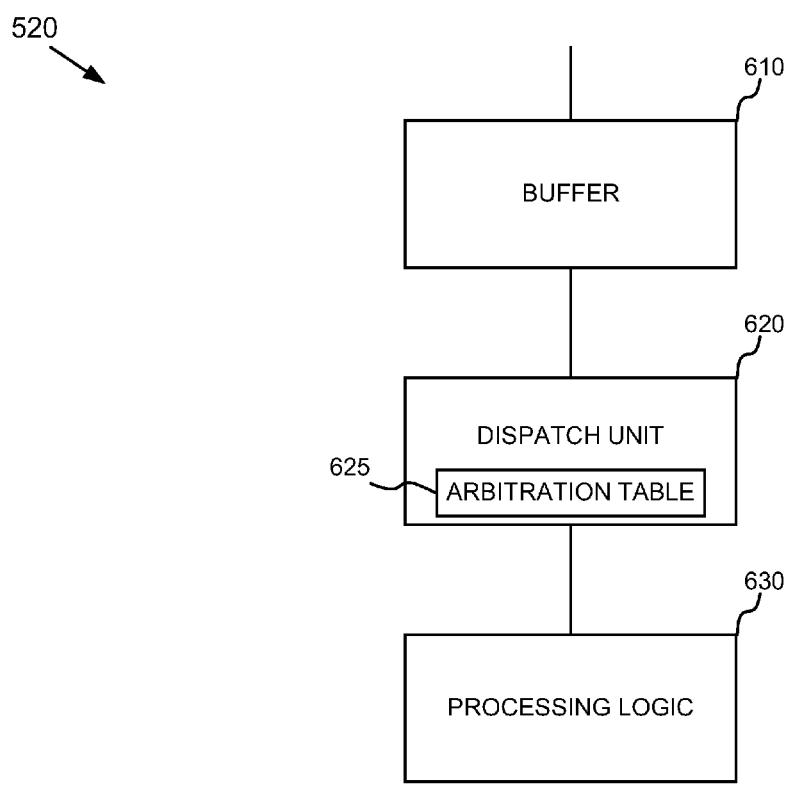
FIG. 6 is an exemplary diagram of the input logic of FIG. 5.

Input logic 520 may provide initial processing to packet data received from PICs 210. FIG. 6 is an exemplary diagram of input logic 520 in an implementation consistent with principles of the invention. Input logic 520 may include a buffer 610, a dispatch unit 620, and processing logic 630.

Figure 7:
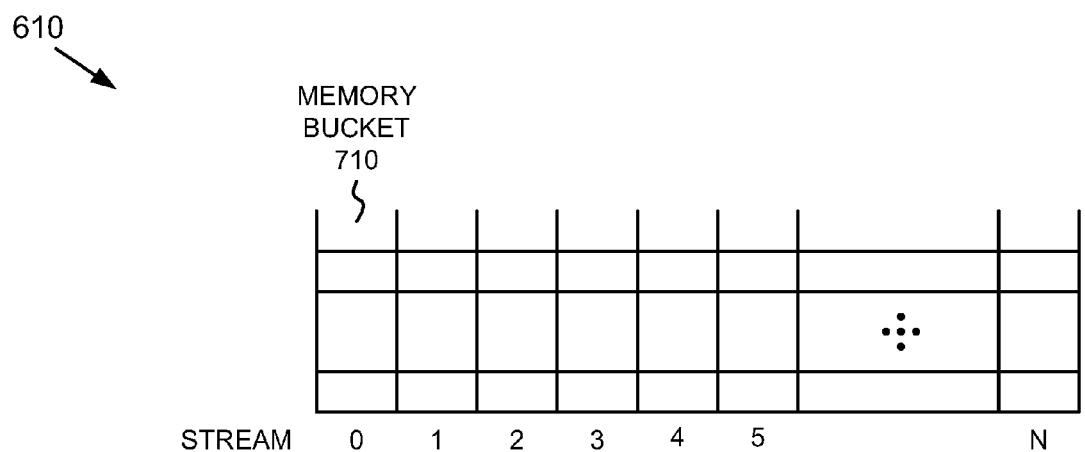
FIG. 7 is an exemplary diagram of the buffer of FIG. 6.

Buffer 610 may include one or more memory devices, such as one or more first-in, first-out (FIFO) static random access memories (SRAMs), that are partitioned on a per stream basis. FIG. 7 is an exemplary diagram of buffer 610 consistent with principles of the invention. Buffer 610 may include a number of memory buckets 710 equal to the number of possible packet streams. Buffer 610 may sort packet data it receives based on their stream ID and store the data in the memory bucket corresponding to the stream. The amount of memory allocated to each of the streams (i.e., the size of memory buckets 710) may be fixed regardless of the speed of the streams. For example, in one implementation, each of memory bucket 710 may be configured to store 512 entries of 256 bits each.

Returning to FIG. 6, dispatch unit 620 may include logic that determines when and what to read from buffer 610 for processing by processing logic 630. In other words, dispatch unit 620 may determine how to allocate bandwidth to streams of packet data sent to processing logic 630. Dispatch unit 620 can handle varying levels of granularity of stream speeds. For example, in one implementation, stream speeds are programmed to STS-3 granularity.

To implement varying granularity, dispatch unit 620 may use an arbitration element, such as arbitration table 625, that has entries corresponding to a particular unit of bandwidth. Arbitration elements other than tables may also be used. Arbitration table 625 might, for example, consist of 64 entries, with each entry corresponding to an STS-3's worth of bandwidth. Each entry in the table can be a 6-bit number indicating which stream is to be serviced for that arbitration slot.

For purposes of illustration, assume that arbitration table 625 allocates bandwidth among four streams, labeled 0-3. In this case, arbitration table 625 may be configured as follows:

| STREAM NUMBER |
| --- |
| 0 |
| 1 |
| 2 |
| 1 |
| 3 |
| 1 |
| 0 |
| 1 |
| 2 |

In this example, stream 1 is allocated much more of the bandwidth than are streams 0, 2, and 3. Dispatch unit 620 may read a stream number from arbitration table 625, read data from the memory bucket in buffer 610 that corresponds to the stream, and transmit the data to processing logic 630.

Arbitration table 625 may be programmed under software control. For example, an operator may specify a speed for each of the packet streams. The software may then update arbitration table 625 based on the specified speeds. A faster stream may be given more slots and a slower stream may be given less slots in arbitration table 625.

In an implementation consistent with principles of the invention, arbitration table 625 resembles arbitration table 425 in PIC 210. If arbitration tables 425 and 625 are synchronized, there should be no need to make the size of the memory buckets 710 in buffer 610 dependent on the stream speed because PIC 210 sends packet data for each of the streams to buffer 610 at the same rate that dispatch unit 620 reads packet data for the streams from buffer 610.

Processing logic 630 may process header information in the packet data. For example, processing logic 630 may convert the layer 2 (L2) and layer 3 (L3) packet header information (collectively, L23) into information for use by packet processor 510 (FIG. 5). Processing logic 630 may also create other information related to the packet.

Initial Packet Processing

Figure 8:
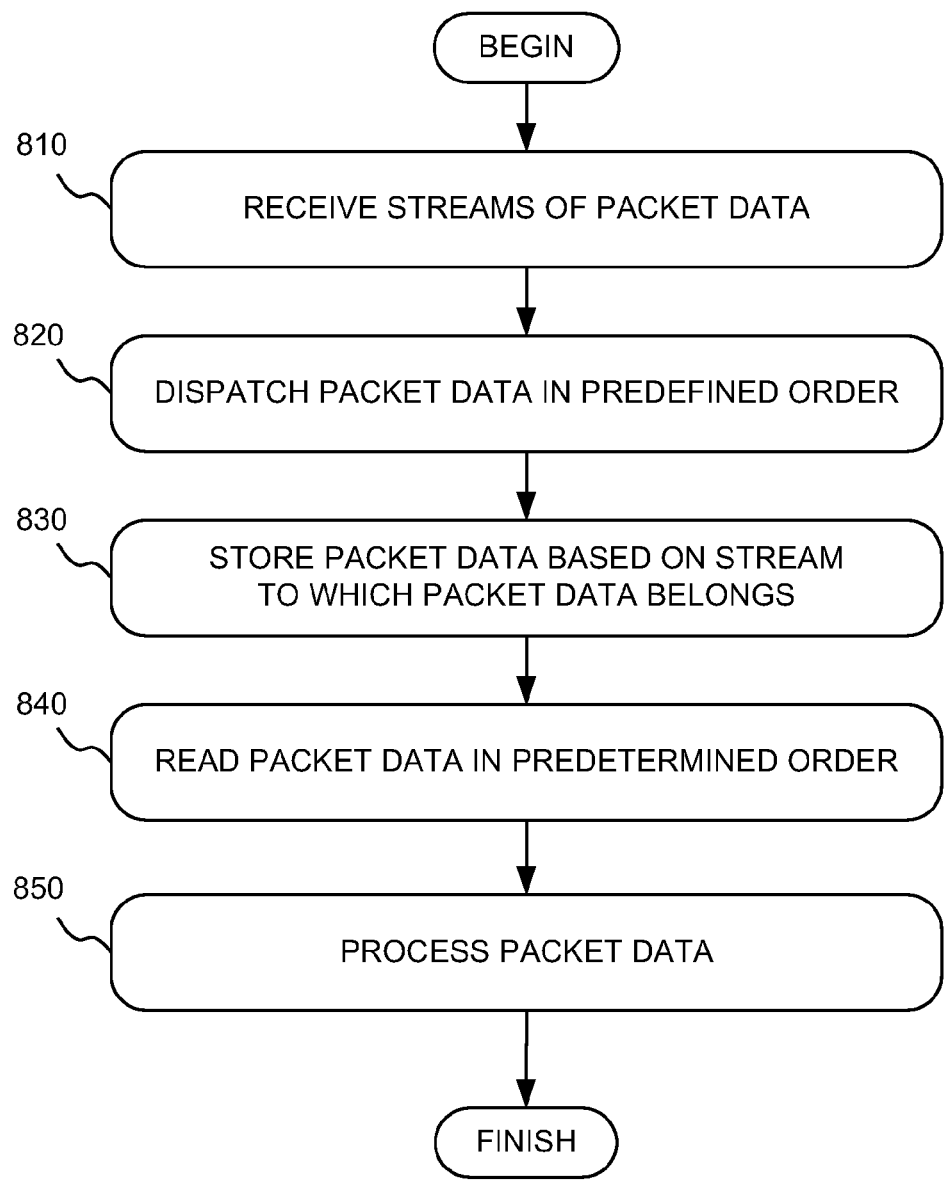
FIG. 8 is an exemplary flowchart of initial processing of packets received by the routing system of FIG. 1 in an implementation consistent with principles of the invention.

FIG. 8 is an exemplary flowchart of initial processing of packets received by a system, such as routing system 100, in an implementation consistent with principles of the invention. Processing may begin with system 100 receiving streams of packet data which it analyzes and routes to its destination or a next hop toward the destination. WAN interface 410 of PIC 210 may receive packet data belonging to multiple packet streams (act 810). WAN interface 410 may strip off the layer (L1) protocol information from the incoming packet data and forward the remaining data to FPC interface controller 420.

Interface controller 420 may determine how to allocate bandwidth to the streams of packet data it outputs. Interface controller 420 may use its arbitration table 425 to allocate bandwidth. For example, interface controller 420 may allocate a predetermined amount of bandwidth, such as an STS-3's worth of bandwidth, to each of the stream numbers in arbitration table 425. To dispatch data, interface controller 420 may read a stream number from arbitration table 425, gather packet data corresponding to the stream, attach a stream ID, and transmit the data to FPC 220 (act 820).

Buffer 610 within FPC 220 may store packet data from interface controller 420 in a memory bucket 710 according to the streams to which the packet data belong (act 830). For example, if buffer 610 receives packet data belonging to stream 0, buffer 610 stores the packet data in memory bucket 710 corresponding to stream 0. Buffer 610 may identify the stream to which particular packet data belongs based on the stream ID, or some other sort of identifying information, provided with the data.

Dispatch unit 620 may determine how to allocate bandwidth to the streams of packet data stored in buffer 610. Dispatch unit 620 may use its arbitration table 625 to allocate bandwidth. For example, dispatch unit 620 may allocate a predetermined amount of bandwidth, such as an STS-3's worth of bandwidth, to each of the stream numbers in arbitration table 625. To dispatch data, dispatch unit 620 may read a stream number from arbitration table 625, read packet data corresponding to the stream from buffer 610, and transmit the data to processing logic 630 (act 840).

Processing logic 630 may process the packet data by, for example, converting header information into a notification (act 850). For example, processing logic 630 may process layer 2 (L2) and layer 3 (L3) packet header information, and possibly other information, for processing by one or more packet processors, such as packet processors 510 (FIG. 5).

Flow Control System

Figure 9:
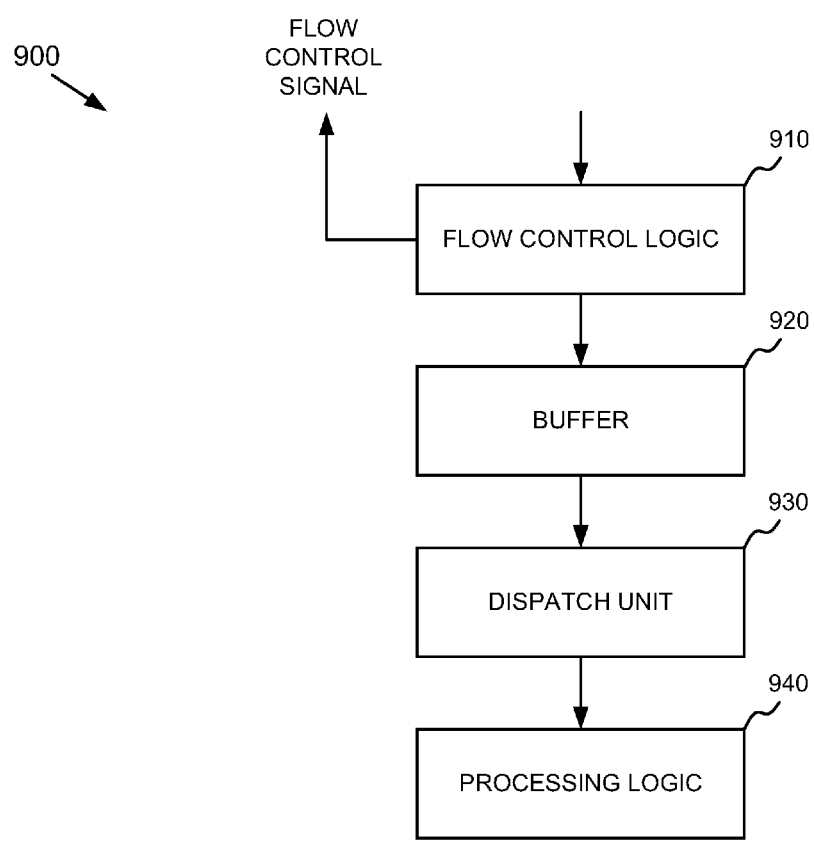
FIG. 9 is an exemplary diagram of input logic with flow control capabilities according to implementations consistent with principles of the invention.

FIG. 9 is an exemplary diagram of input logic 900 with flow control capabilities according to implementations consistent with principles of the invention. Input logic 900 may be used in a system similar to system 100 (FIG. 1). In this implementation, however, FPC interface controller 420 (FIG. 4) and dispatch unit 620 (FIG. 6) may or may not have arbitration tables 425 and 625, respectively.

In the implementation shown in FIG. 9, input logic 900 includes flow control logic 910, buffer 920, dispatch unit 930, and processing logic 940. Assume for purposes of this description that buffer 920, dispatch unit 930, and processing logic 940 are configured similar to buffer 610, dispatch unit 620, and processing logic 630 described above with regard to FIG. 6.

Flow control logic 910 may provide flow control functions to input logic 900. Flow control may be necessary in cases where there is a chance that data may build up and overflow the buffer (e.g., buffer 920). One illustrative case may be where a PIC is sized for a first speed, but the bus between the PIC and the FPC supports a second faster speed. In this case, the PIC may send stream data in bursts at the second speed even though the average rate of transmission may be equal to the first speed. As a result of the burst transfers, data may build up and possibly overflow buffer 920. Flow control in this case may include a signal sent back to the PIC to inform the PIC to stop sending data for that particular stream.

Figure 10:
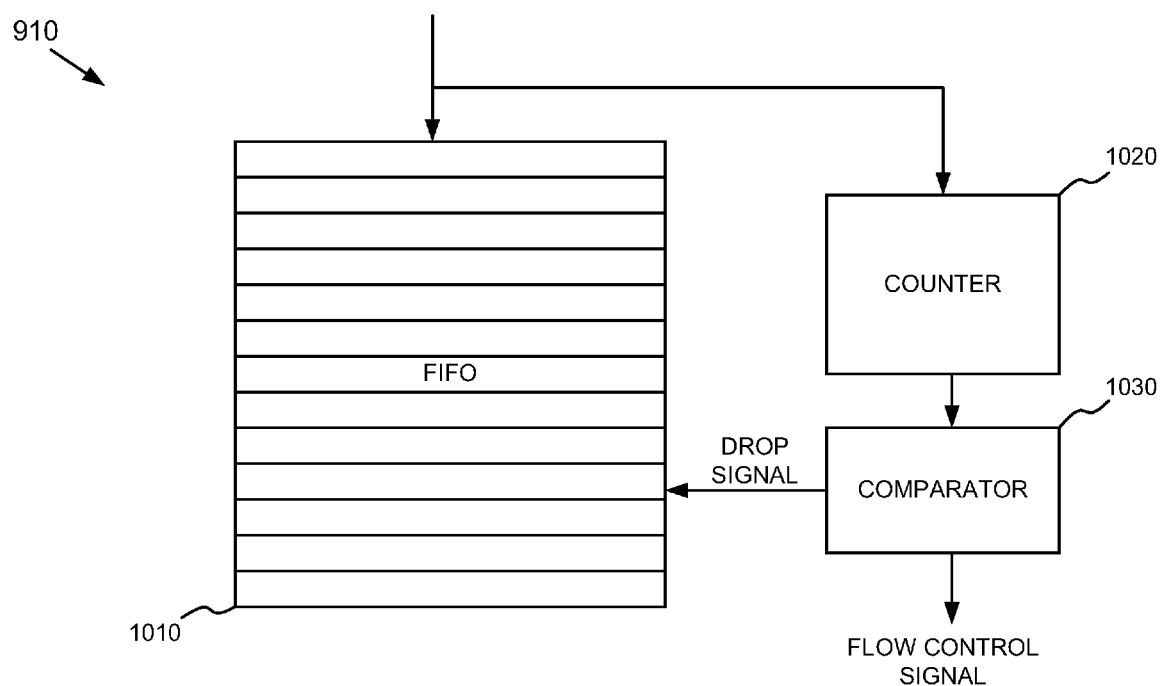
FIG. 10 is an exemplary diagram of flow control logic of FIG. 9 in an implementation consistent with principles of the invention.

FIG. 10 is an exemplary diagram of flow control logic 910 in an implementation consistent with principles of the invention. Flow control logic 910 may include FIFO 1010, a counter 1020, and a comparator 1030. FIFO 1010 may include a memory device that stores data for any stream. FIFO 1010 temporarily buffers data from the PIC. When the data reaches the front of FIFO 1010, it is written to buffer 920.

The size of FIFO 1010 may be chosen to absorb the latency of the assertion of flow control to take effect (i.e., the time it takes for the data to stop for the stream for which flow control was asserted). The latency may be based on the round trip delay for flow control information, which may include the amount of time it takes for flow control information to reach the PIC and the PIC to react to the flow control information by generating idles. In an implementation consistent with principles of the invention, FIFO 1010 is capable of storing at least 192 entries of 128 bits each.

FIFO 1010 saves buffer space because flow control is generated out of a common buffer for all streams. If this were not the case, then the buffer space for all of the streams would have to be increased by the worst case flow control latency.

Counter 1020 may count the number of entries for each stream that are stored in FIFO 1010. In other words, counter 1020 keeps track of the stream to which each entry in FIFO 1010 belongs and counts the total number of entries in FIFO 1010 on a per stream basis.

Comparator 1030 may compare the total numbers of entries in FIFO 1010 for each of the streams to one or more watermarks per stream. The watermarks may be controlled by software and set equal to an expected number of entries for each of the streams based, for example, on the stream's speed. The watermarks may be reprogrammed to compensate for changes in the speed of the corresponding streams.

Comparator 1030 may maintain two watermarks for each of the streams. Either or both of these watermarks may be used in implementations consistent with principles of the invention.

One watermark ("flow control (F/C) watermark") may be used by comparator 1030 when determining when to assert flow control for the corresponding stream. When the number of entries in FIFO 1010 for a stream reaches the F/C watermark, comparator 1030 may assert a flow control signal for that stream. Another watermark ("drop watermark") may be used by comparator 1030 when determining whether to drop data in the corresponding stream. When the number of entries in FIFO 1010 for a stream reaches the drop watermark, comparator 1030 may drop data in that stream.

In implementations consistent with principles of the invention, the value of the drop watermark is greater than the value of the F/C watermark. In this case, flow control logic 910 may begin flow control measures for a stream and drop data when the flow control measures fail to ease the flow of packet data in that stream. This may occur when the PIC fails to respond to flow control measures, such as the case where the PIC does not have the capabilities to perform flow control.

Using the above-described features, input logic 900 may assure that data in a particular stream does not get dropped due to a change in speed of the stream, assuming that the PIC responds to the flow control measures.

Packet Processing with Flow Control

Figure 11:
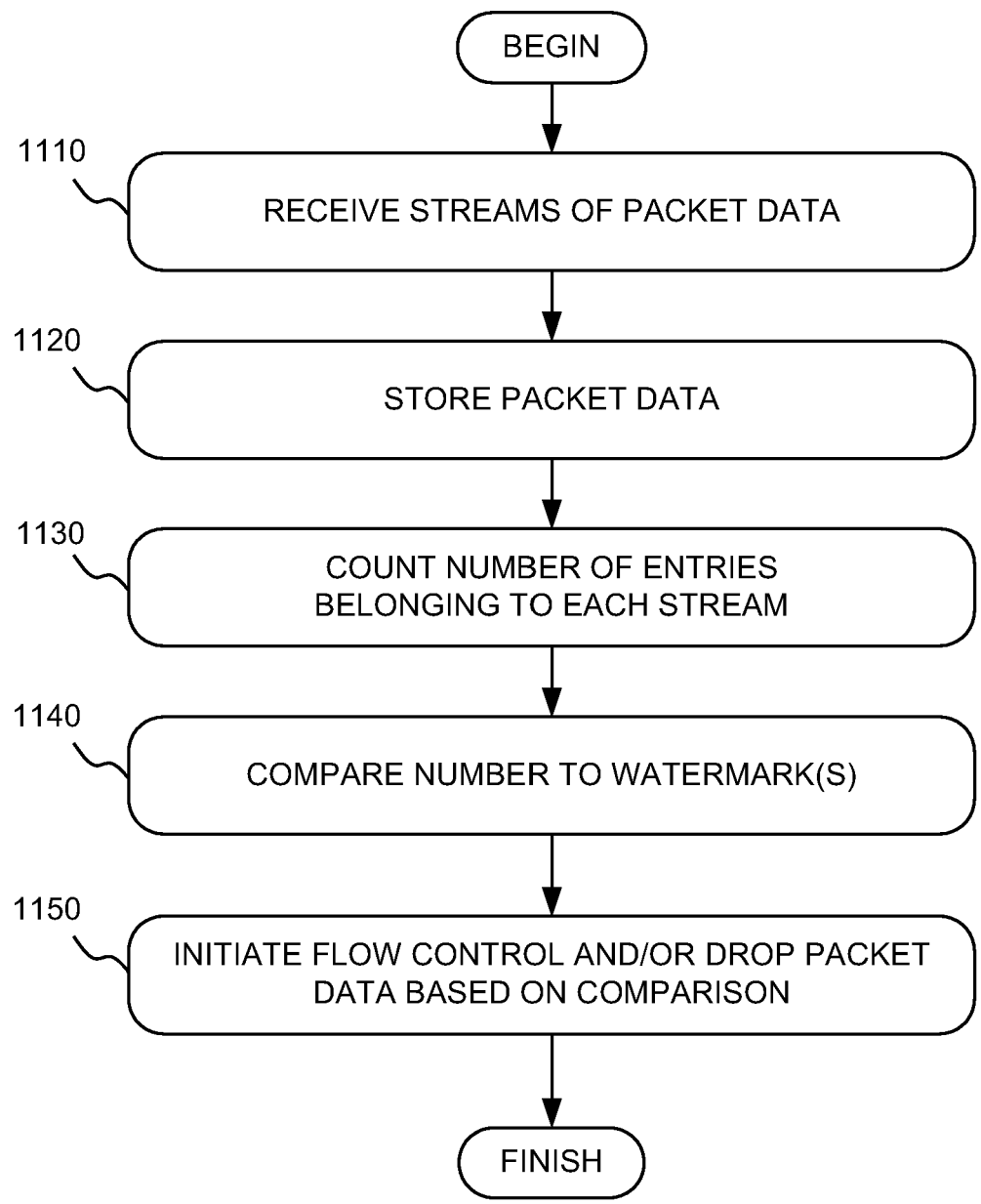
FIG. 11 is an exemplary flowchart of processing by flow control logic of FIG. 9 according to implementations consistent with principles of the invention.

FIG. 11 is an exemplary flowchart of processing by flow control logic 910 according to an implementation consistent with principles of the invention. Processing may begin with a PIC transmitting packet data in a variety of streams to flow control logic 910. Flow control logic 910 may receive the packet data and store it in FIFO 1010 in the order of their arrival (acts 1110 and 1120). Counter 1020 may monitor the reception and transmission of packet data and track the number of entries in FIFO 1010 belonging to each of the streams. Counter 1020 may count the total number of entries in FIFO 1010 on a stream-by-stream basis (act 1130).

Comparator 1030 may compare each of the total values to one or more watermarks corresponding to the stream (act 1140). For example, comparator 1030 may compare a total value to the F/C watermark and/or drop watermark for a stream. If the total value exceeds the F/C watermark, comparator 1030 may initiate flow control measures by generating a flow control signal that it sends to the PIC (act 1150). In this case, FIFO 1010 may continue to buffer packet data for the stream until the flow control measures take effect.

If the total value exceeds the drop watermark, comparator 1030 may begin to drop packet data in the stream by generating a drop signal that it sends to FIFO 1010 (act 1150). In response to the drop signal, FIFO 1010 may drop packet data in the stream from either the top or bottom of the FIFO.

In an alternate implementation, comparator 1030 sends the drop signal to buffer 920 (FIG. 9). In response to the drop signal, buffer 920 may drop packet data in the stream from either the bottom or top of the memory bucket.

When FIFO 1010 drops packet data or outputs packet data to buffer 920, counter 1020 decrements its count. Based on this decremented count, comparator 1030 may continue or discontinue asserting the flow control and/or drop signals.

Other Implementations

Systems have been described for initially processing packet data using arbitration tables and/or flow control measures. In other implementations consistent with principles of the invention, yet other systems may be used. In another implementation, the buffer within the input logic is partitioned based on the known speed of the streams. If one of the streams changes speed, however, the buffer is repartitioned based on the change in speed.

In yet another implementation, the buffer is partitioned with oversized memory buckets. The size of the memory buckets is chosen so that even the fastest stream will not overflow the memory bucket.

CONCLUSION

Systems and methods consistent with the principles of the invention provide input logic for a multistream interface of a routing system. The input logic permits multiple input streams to interface to the routing system without requiring reconfiguration of the routing system in response to changes to the stream speed.

When a stream is reconfigured (i.e., when the speed of the stream changes), the input logic adjusts arbitration tables and flow control and/or drop watermarks. Instead of allocating buffer space according to the speed of the stream, the processing rate is changed and the buffer space is fixed. Because the buffer space does not need to be reallocated, no other stream is affected and no data is lost.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system that processes and buffers data.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A method performed by a network device, comprising:
storing, by the network device and in a plurality of entries associated with a first arbitration element, a plurality of data stream identifiers, one of the plurality of data stream identifiers being stored in a respective quantity of entries, of the plurality of entries, based on a speed of a respective data stream, of a plurality of data streams, that corresponds to the one of the plurality of data stream identifiers;
receiving, by the network device, packet data associated with the plurality of data streams;
identifying, by the network device, a data stream identifier stored in a first entry, of the plurality of entries, associated with the first arbitration element, the data stream identifier corresponding to a data stream of the plurality of data streams;
storing, in a memory associated with the network device, the packet data associated with the data stream;
identifying, by the network device, a particular data stream identifier stored in another first entry, of another plurality of entries, associated with a second arbitration element, the particular data stream identifier corresponding to a particular data stream of the plurality of data streams; and
reading, from the memory associated with the network device, the packet data associated with the particular data stream.

2. The method of claim 1, where each entry in the first arbitration element is associated with a bandwidth unit that corresponds to a particular quantity of bandwidth, the method further comprising:
specifying a speed associated with the data stream;
determining a respective allocated bandwidth for the data stream based on the specified speed associated with the data stream; and
allocating the respective quantity of entries for the data stream based on the respective allocated bandwidth for the data stream.

3. The method of claim 2, further comprising:
increasing the specified speed for the particular data stream of the plurality of data streams; and
allocating additional entries, of the other plurality of entries, for the particular data stream.

4. The method of claim 1, further comprising:
receiving a flow control notification from a flow controller, the flow control notification indicating that packet data associated with the particular data stream is not to be processed; and
ceasing to read packet data, associated with the particular data stream, from the memory in response to the flow control notification.

5. The method of claim 1, where the memory includes a plurality of memory buckets for the plurality of data streams, a respective one of the plurality of memory buckets corresponds to the data stream; and where storing the packet data associated with the data stream, further includes:
storing the packet data, associated with the data stream, in the respective one of the plurality of memory buckets that corresponds to the data stream.

6. The method of claim 5, further comprising:
determining that the respective one of the plurality of memory buckets has reached capacity; and
based on the determination that the respective one of the plurality of memory buckets has reached capacity:
dropping the packet data associated with the data stream, or
ceasing to process the packet data associated with the data stream.

7. A system, comprising:
a memory to store packet data associated with a plurality of data streams of different speeds;
an interface controller to arbitrate among the plurality of data streams to store the packet data in the memory based on a next entry in a first arbitration table, where the first arbitration table includes:
a respective quantity of entries corresponding to each data stream, of the plurality of data streams, where the respective quantity of entries are set based on a respective speed associated with the each data stream;
a flow controller to determine whether to initiate flow control over the packet data based on a quantity of packet data, associated with the each data stream and stored in the memory, and a respective flow control threshold for the each data stream; and
a dispatcher to arbitrate among the plurality of data streams to read the packet data from the memory based on another next entry in a second arbitration table, where the second arbitration table includes:
another respective quantity of entries corresponding to the each data stream, where the other respective quantity of entries is set based on a respective speed associated with the each data stream.

8. The system of claim 7, where the memory includes:
a different memory bucket for each data stream, of the plurality of data streams.

9. The system of claim 7, where the flow controller is further to:
determine that a quantity of packet data associated with a particular data stream, of the plurality of data streams, is greater than a flow control threshold associated with the particular data stream, and
send a notification to the interface controller to cease processing packet data associated with the particular data stream upon determining that the quantity of packet data is greater than the flow control threshold.

10. The system of claim 9, where the memory is a first-in-first-out (FIFO) memory, where a size of the FIFO memory is based on a latency that corresponds to a response time for the interface controller to receive the notification and to cease processing the packet data associated with the particular data stream.

11. The system of claim 7, where the flow controller is further to:
determine that a quantity of packet data, associated with a particular data stream of the plurality of data streams, is greater than a drop packet threshold associated with the particular data stream, where the drop packet threshold is greater than the flow control threshold, and
drop packet data associated with the particular data stream upon determining that the quantity of packet data is greater than the drop packet threshold.

12. The system of claim 7, where the flow controller is further to:
determine a quantity of entries, in the memory, that store packet data that is associated with a particular data stream, of the plurality of data streams,
compare the quantity of entries with the flow control threshold,
initiate the flow control over the packet data, associated with the particular data stream, when the quantity of entries is greater than the flow control threshold, and
process the packet data, associated with the particular data stream, without the flow control when the quantity of entries is less than or equal to the flow control threshold.

13. The system of claim 7, where the interface controller is further to:
determine that the next entry corresponds to a particular data stream, of the plurality of data streams, and
process packet data associated with the particular data stream upon determining that the next entry corresponds to the particular data stream.

14. The system of claim 7, where the dispatcher is further to:
determine that the other next entry corresponds to a particular data stream, of the plurality of data streams, and
read, from the memory, packet data associated with the particular data stream upon determining that the other next entry corresponds to the particular data stream.

15. A network device, comprising:
an interface to:
receive packet data associated with a plurality of data streams, and
forward the packet data; and
a flow controller to:
receive the packet data forwarded by the interface,
store the packet data in a memory associated with the network device,
identify a quantity of entries, in the memory, that store packet data for each data stream, of the plurality of data streams,
compare the quantity of entries for a particular data stream, of the plurality of data streams, to a flow control threshold, corresponding to the particular data stream, to determine whether to initiate flow control over the particular data stream,
process the particular data stream without flow control when the quantity of entries for the particular data stream is less than or equal to the flow control threshold,
compare the quantity of entries, for the particular data stream, to a drop packet threshold corresponding to the particular data stream, when the quantity of entries for the particular data stream is greater than the flow control threshold, where the drop packet threshold is greater than the flow control threshold,
send, to the interface, a notification to cease forwarding packet data associated with the particular data stream when the quantity of entries for the particular data stream is less than or equal to the drop packet threshold, and
drop the packet data associated with the particular data stream when the quantity of entries for the particular data stream is greater than the drop packet threshold.

16. The network device of claim 15, where the memory is a first-in-first-out (FIFO) memory in which packet data is processed only when the packet data reaches a first entry of a plurality of entries within the FIFO memory, and where, when processing the particular data stream without flow control, the flow controller is further to:
determine that packet data associated with the particular data stream has reached the first entry within the FIFO memory, and
process the packet data associated with the particular data stream upon determining that the packet data associated with the particular data stream has reached the first entry within the FIFO memory.

17. The network device of claim 15, where the flow control threshold for the particular data stream or the drop packet threshold for the particular data stream is based on a speed associated with the particular data stream.

18. The network device of claim 15, where the flow controller is further to:
drop the packet data associated with the particular data stream when the interface fails to respond to the notification to cease forwarding the packet data associated with the particular data stream.

19. The network device of claim 15, where, after sending the notification to cease forwarding the packet data associated with the particular data stream, the flow controller is further to:
continue to process the packet data until a response, to the notification to cease forwarding the packet data, is received from the interface.

20. The network device of claim 15, where the flow controller is further to:
set a size for the memory based on a duration of time for the interface to respond to the notification to cease forwarding the packet data associated with the particular data stream.

21. A method, comprising:
receiving, by a network device and from an interface of the network device, packet data associated with a plurality of data streams;
storing, in a memory associated with the network device, the packet data in a memory associated with the network device;
identifying, by the network device, a quantity of entries, in the memory, that store packet data for each data stream, of the plurality of data streams;
comparing, by the network device, the quantity of entries for a particular data stream, of the plurality of data streams, to a flow control threshold that corresponds to the particular data stream, to determine whether to initiate flow control over the particular data stream;
when the comparing yields a first outcome:
processing, by the network device, the particular data stream without flow control, and
sending, by the network device, a notification to cease forwarding packet data associated with the particular data stream; and
when the comparing yields a different second outcome:
comparing, by the network device, the quantity of entries for the particular data stream to a drop packet threshold corresponding to the particular data stream, where the drop packet threshold is greater than the flow control threshold, and
dropping, by the network device, the packet data associated with the particular data stream.

22. The method of claim 21, where the first outcome comprises the quantity of entries for the particular data stream being less than the flow control threshold.

23. The method of claim 21, where the second outcome comprises the quantity of entries for the particular data stream being greater than the drop packet threshold.

* * * * *

UNITED STATES PATENT AND TRADEMARK OFFICE
CERTIFICATE OF CORRECTION

PATENT NO.        : 8,131,854 B2
APPLICATION NO.   : 12/698794
DATED             : March 6, 2012
INVENTOR(S)       : Stefan Dyckerhoff et al.

It is certified that error appears in the above-identified patent and that said Letters Patent is hereby corrected as shown below:

Column 11, claim 7, line 28, following the word "data" delete ",";

Column 11, claim 7, line 29, following the word "memory", delete ",".

Signed and Sealed this
Seventeenth Day of April, 2012

David J. Kappos
*Director of the United States Patent and Trademark Office*